United States Patent
Montreuil

(10) Patent No.: US 10,856,101 B2
(45) Date of Patent: Dec. 1, 2020

(54) METHOD AND SYSTEM FOR FACILITATING COMMUNICATION BASED ON USER INTERESTS AND LOCATION

(71) Applicant: Innovative Concepts Inc., Homer, GA (US)

(72) Inventor: Albert Hilaire Montreuil, Homer, GA (US)

(73) Assignee: INNOVATIVE CONCEPTS INC., Homer, GA (US)

( * ) Notice: Subject to any disclaimer, the term of this patent is extended or adjusted under 35 U.S.C. 154(b) by 0 days.

(21) Appl. No.: 16/315,776

(22) PCT Filed: Aug. 16, 2017

(86) PCT No.: PCT/IB2017/054988
§ 371 (c)(1),
(2) Date: Jan. 7, 2019

(87) PCT Pub. No.: WO2018/033870
PCT Pub. Date: Feb. 22, 2018

(65) Prior Publication Data
US 2020/0186959 A1    Jun. 11, 2020

Related U.S. Application Data

(60) Provisional application No. 62/375,803, filed on Aug. 16, 2016.

(51) Int. Cl.
*H04W 4/021* (2018.01)
*H04W 4/029* (2018.01)
(Continued)

(52) U.S. Cl.
CPC ...... *H04W 4/021* (2013.01); *G06F 16/24575* (2019.01); *G06F 16/29* (2019.01); *H04L 67/306* (2013.01); *H04W 4/029* (2018.02)

(58) Field of Classification Search
CPC . H04W 4/021; H04W 4/029; G06F 16/24575; G06F 16/29; H04L 67/306
(Continued)

(56) References Cited

U.S. PATENT DOCUMENTS

2007/0282621 A1* 12/2007 Altman .................. G06Q 10/10
705/319
2012/0282945 A1* 11/2012 Guha .................... H04W 4/023
455/456.1

(Continued)

*Primary Examiner* — Ronald Eisner

(57) ABSTRACT

Disclosed is a method of facilitating communication based on user interest. The method includes receiving, using a communication device, multiple locations corresponding to multiple user devices and generating, using a processing device, multiple anonymized locations corresponding to the multiple locations. Further, the method includes storing, using a storage device, the multiple anonymized locations in association with the multiple user accounts and receiving, using the communication device, a request from a user device associated with a user account, wherein the user account is associated with a user interest. Yet further, the method includes identifying, using the processing device, one or more anonymized locations associated with one or more user accounts from the multiple user accounts based on the user interest. Moreover, the method includes transmitting, using the communication device, the one or more anonymized locations associated with the one or more user accounts to the user device.

18 Claims, 10 Drawing Sheets

(51) Int. Cl.
  *G06F 16/2457*  (2019.01)
  *G06F 16/29*  (2019.01)
  *H04L 29/08*  (2006.01)

(58) Field of Classification Search
  USPC .............. 455/404.1, 404.2, 456.1–457;
        340/539.13, 988–996; D10/104.2
  See application file for complete search history.

(56) References Cited

U.S. PATENT DOCUMENTS

| | | | |
|---|---|---|---|
| 2014/0187266 A1* | 7/2014 | Nawaz | H04W 12/02 455/456.3 |
| 2016/0087925 A1* | 3/2016 | Kalavagattu | H04L 51/066 709/206 |
| 2016/0378776 A1* | 12/2016 | Green | G06F 16/9537 707/737 |

* cited by examiner

METHOD AND SYSTEM FOR FACILITATING COMMUNICATION BASED ON USER INTERESTS AND LOCATION

The current application is a 371 of international Patent Cooperation Treaty (PCT) application PCT/IB2017/054988 filed on Aug. 16, 2017.

FIELD OF THE INVENTION

The present invention relates to communication technology. In particular, the present invention relates to a method and a system for facilitating communication between users based on user interest.

BACKGROUND OF THE INVENTION

There is an inherent need for humans to communicate with one another. Many technologies have been developed to facilitate communication between people. This includes telegraphs, telephone, pagers, cell phones and computers. The Internet has helped people organize into complex groups online to work together. Many services available on the Internet allow users to form groups based on their interest and locations. However, often people may want to communicate with other people under anonymity. Further, people may want to communicate with other users nearby as it will help them easily coordinate to work together.

Accordingly, there is a need for methods and systems for finding and connecting individuals with similar interests in a simple, fast, inexpensive, anonymous manner anywhere in the world.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

Disclosed is a method of facilitating communication based on user interest. The method includes receiving, using a communication device, a plurality of locations corresponding to a plurality of user devices, wherein the plurality of user devices is associated with a plurality of user accounts, wherein each user account is associated with at least one user interest. Further, the method includes generating, using a processing device, a plurality of anonymized locations corresponding to the plurality of locations. Yet further, the method includes storing, using a storage device, the plurality of anonymized locations in association with the plurality of user accounts. Moreover, the method includes receiving, using the communication device, a request from a user device associated with a user account, wherein the user account is associated with a user interest. Further, the method includes identifying, using the processing device, at least one anonymized location associated with at least one user account from the plurality of user accounts based on the user interest. Yet further, the method includes transmitting, using the communication device, the at least one anonymized location associated with the at least one user account to the user device.

According to some aspects, a system for facilitating communication based on user interest is disclosed. The system includes a communication device configured for receiving a plurality of locations corresponding to a plurality of user devices, wherein the plurality of user devices is associated with a plurality of user accounts, wherein each user account is associated with at least one user interest. Further, the communication device is configured for receiving a request from a user device associated with a user account, wherein the user account is associated with a user interest. Yet further, the communication device is configured for transmitting at least one anonymized location associated with the at least one user account to the user device. Moreover, the system includes a processing device configured for generating a plurality of anonymized locations corresponding to the plurality of locations and identifying the at least one anonymized location associated with at least one user account from the plurality of user accounts based on the user interest. Further, the system includes a storage device configured for storing the plurality of anonymized locations in association with the plurality of user accounts.

According to some aspects, the present disclosure provides an innovative system for finding and connecting individuals with similar interests in a simple, fast, inexpensive, anonymous manner anywhere in the world.

According to some aspects, the present disclosures relates to a mobile application "whoisnear". The users may install this mobile application on their electronic communication device to find and communicate with other users with similar interests.

According to some aspects, the present disclosure relates to a system and an application that functions on smartphones, iPads, and other digital equipment to permit users to find other users with similar interests (B) near their workplaces, neighborhoods and cities. Upon activating the application to search for other users with similar interests on a user device, the GPS coordinates of the user device may be transmitted to a high-speed, high-capacity server database. These GPS coordinates may be updated periodically. The application may retrieve GPC coordinates with other users nearby and display the same (e.g., with a location pin) on a map on the user device. For example, the application may display a certain number of other users (say 100) at a time. The GPS coordinates of all users may be constantly stored in the server's database. When the user clicks a location pin, only the username of the located individual may be displayed. When the user clicks an envelope symbol, a pre-prepared text message may be displayed (i.e., "Like you, I'm a member/supporter of _____, and I noticed that you are close to my present location. I'd enjoy chatting with you to talk about how combining our efforts can benefit our mutual mission. Please text or call me at _____."). The message may be modified to more appropriately describe the reason the user wants to meet the located user before clicking "Send." Each person's anonymity is maintained within the application while providing individuals an opportunity to communicate with one another to explore mutual interests outside the application itself.

According to further aspects, leaders, directors, and monitors may be displayed on a map with different colored pins. The application allows users to contact these leaders to volunteer, order supplies, or get directions. Further, the leaders may be provided with the ability to locate and contact individuals with similar interests within their area of responsibility. Further, the leaders may be provided with the ability to send targeted notifications, instructions, and event/meeting invitations by state, city, and/or ZIP code.

According to some aspects, the present disclosure relates to specialized application for special groups (such as self-help groups). The users may download a specific application to express interest in corresponding group. Further, the disclosure relates to facilitating communication between users in various groups by providing auto-generated messages based on their group (or interest). Yet further, the location of users may be randomized to maintain anonymity. For example, the location of users may be randomized by 15-100 yards.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
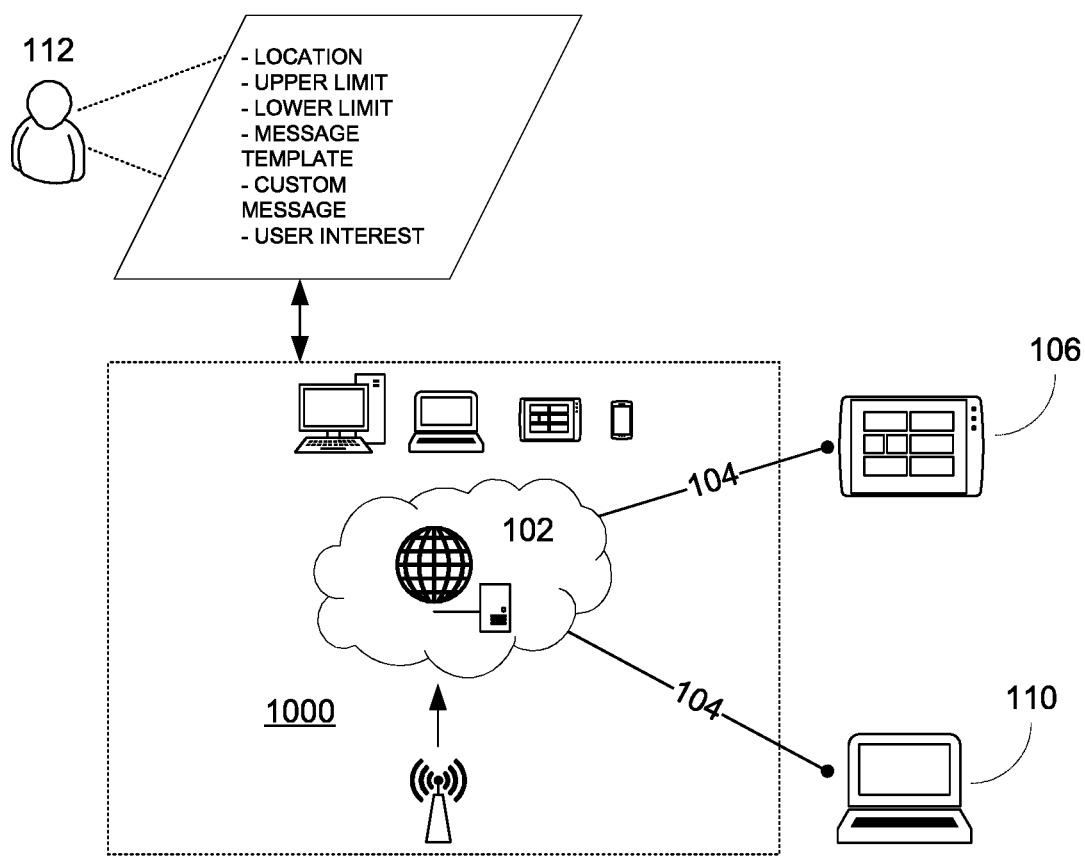
FIG. 1 illustrates an exemplary environment in which embodiments of the present disclosure may be implemented.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of facilitating communication among users, embodiments of the present disclosure are not limited to use only in this context.

Referring now to figures, FIG. 1 is an illustration of a platform consistent with various embodiments of the present disclosure. By way of non-limiting example, the online platform 100 for facilitating communication based on user interest may be hosted on a centralized server 102, such as, for example, a cloud computing service. The centralized server 102 may communicate with other network entities, such as, for example, a mobile device (such as a smartphone, a laptop, a tablet computer etc.) and other electronic devices (such as desktop computers, etc.) over a communication network 104, such as, but not limited to, the Internet. Further, users of the platform may include one or more relevant parties such as, members of general public and administrators. Accordingly, electronic devices operated by the one or more relevant parties may be in communication with the platform. For example, the platform may be in communication with a member electronic device 106 operated by a member of general public and an administrator electronic device 110 operated by the administrator.

A user 112, such as the one or more relevant parties, may access platform 100 through a software application. The software application may be embodied as, for example, but not be limited to, a website, a web application, a desktop application, a mobile application and a gaming machine compatible with a computing device 1000. The computing device 1000 is explained in further detail in conjunction with FIG. 10 below.

In some embodiments, the online platform 100 may provide one or more mobile applications corresponding to one or more user interests. For instance, multiple applications may be provided corresponding to multiple self-help groups (such as alcoholics anonymous). Accordingly, the users may select and download one or more applications to their user devices based on their interests. Further, the online platform 100 may monitor such downloading of applications by the user devices. Accordingly, the online platform may capture user data (including name, contact details, interest, and location) and associate the user data with downloaded applications. Additionally, in some embodiments, the online platform may communicate the user data so captured to third parties, such as, for example, self-help organizations. As a result, such self-help organizations may be able to reach out (e.g. targeted marketing and support) to users in order to facilitate activities relevant to the user's interests. Further, the online platform 100 may enable a third party to view concentration of application users in a selected region (e.g. neighborhoods, city, county, state and country). Furthermore, in some embodiments, one or more third parties, such as self-help organizations may be displayed on the map in addition to other users with similar interests. Accordingly, a user viewing the map may be able to contact either other users with similar interests or one or more third parties, such as regional offices of self-help organization. In addition, in some embodiments, the user may also be able to view the location of each meeting, area and regional office location.

Figure 2:
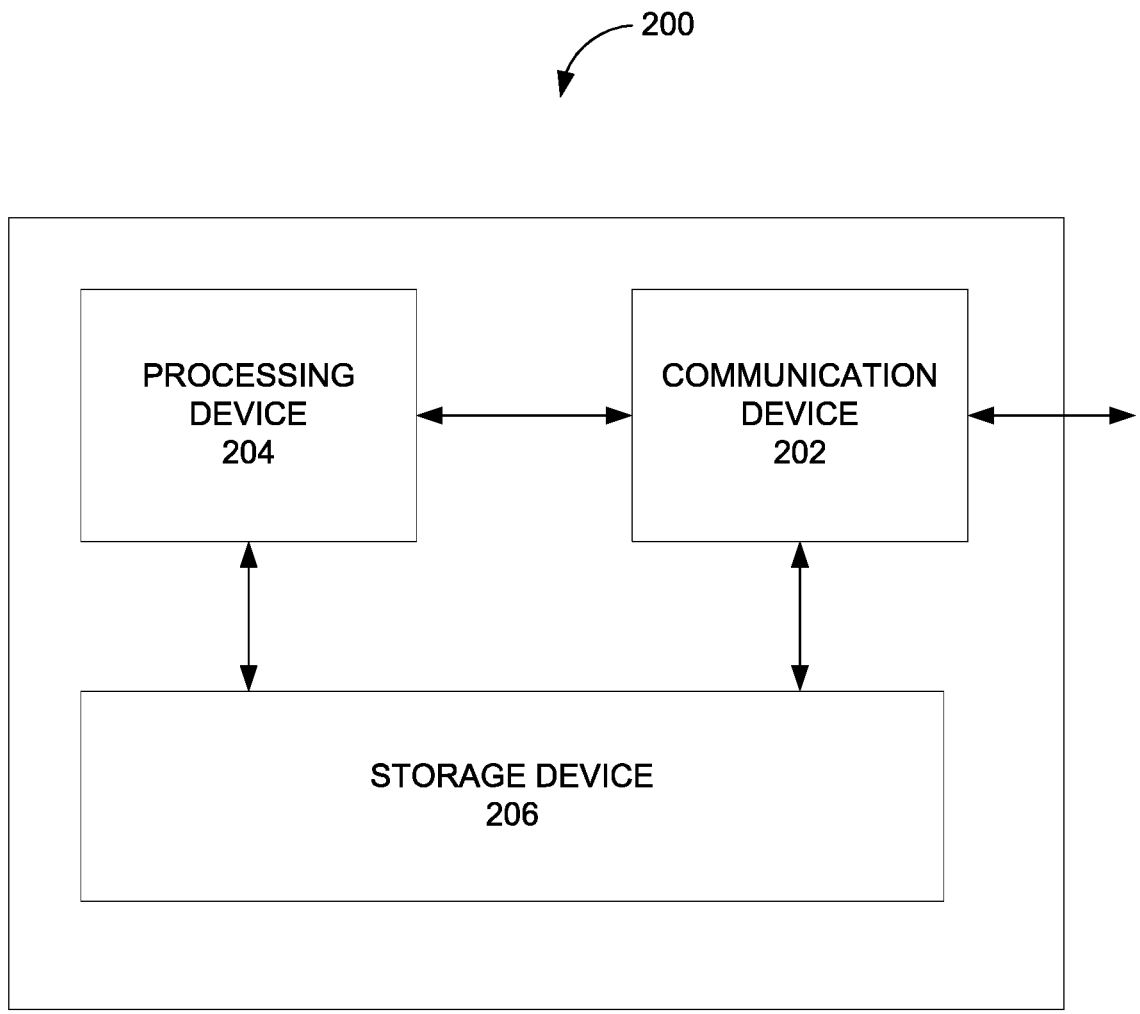
FIG. 2 is a block diagram of a system for facilitating communication based on user interest, in accordance with some embodiments.

FIG. 2 is a block diagram of a system 200 for facilitating communication based on user interest, in accordance with some embodiments. The system 200 may include a communication device 202, a processing device 204 and a storage device 206. The communication device 202 may be configured for receiving multiple locations corresponding to multiple user devices (such as the member device 106). The multiple user devices may be associated with multiple user accounts, wherein each user account is associated with one or more user interests. For example, the one or more user interests may be related to self-help groups such as, but not limited to, Alcoholics Anonymous (AA), Emotions Anonymous (EA), Marijuana Anonymous, Sexaholics Anonymous (SA), GROW, Overeaters Anonymous (OA) and Food Addicts in Recovery Anonymous (FA). Further, the communication device 202 may be configured for receiving a request from a user device associated with a user account, wherein the user account is associated with a user interest. Yet further, the communication device 202 may be configured for transmitting one or more anonymized locations associated with the one or more user accounts to the user device.

The processing device 204 may be configured for generating multiple anonymized locations corresponding to the multiple locations and identifying the one or more anonymized locations associated with one or more user accounts from the multiple user accounts based on the user interest. The storage device 206 may be configured for storing the multiple anonymized locations in association with the multiple user accounts. The operation of the system 200 is explained in further detail in conjunction with FIGS. 3-9 below.

Figure 3:
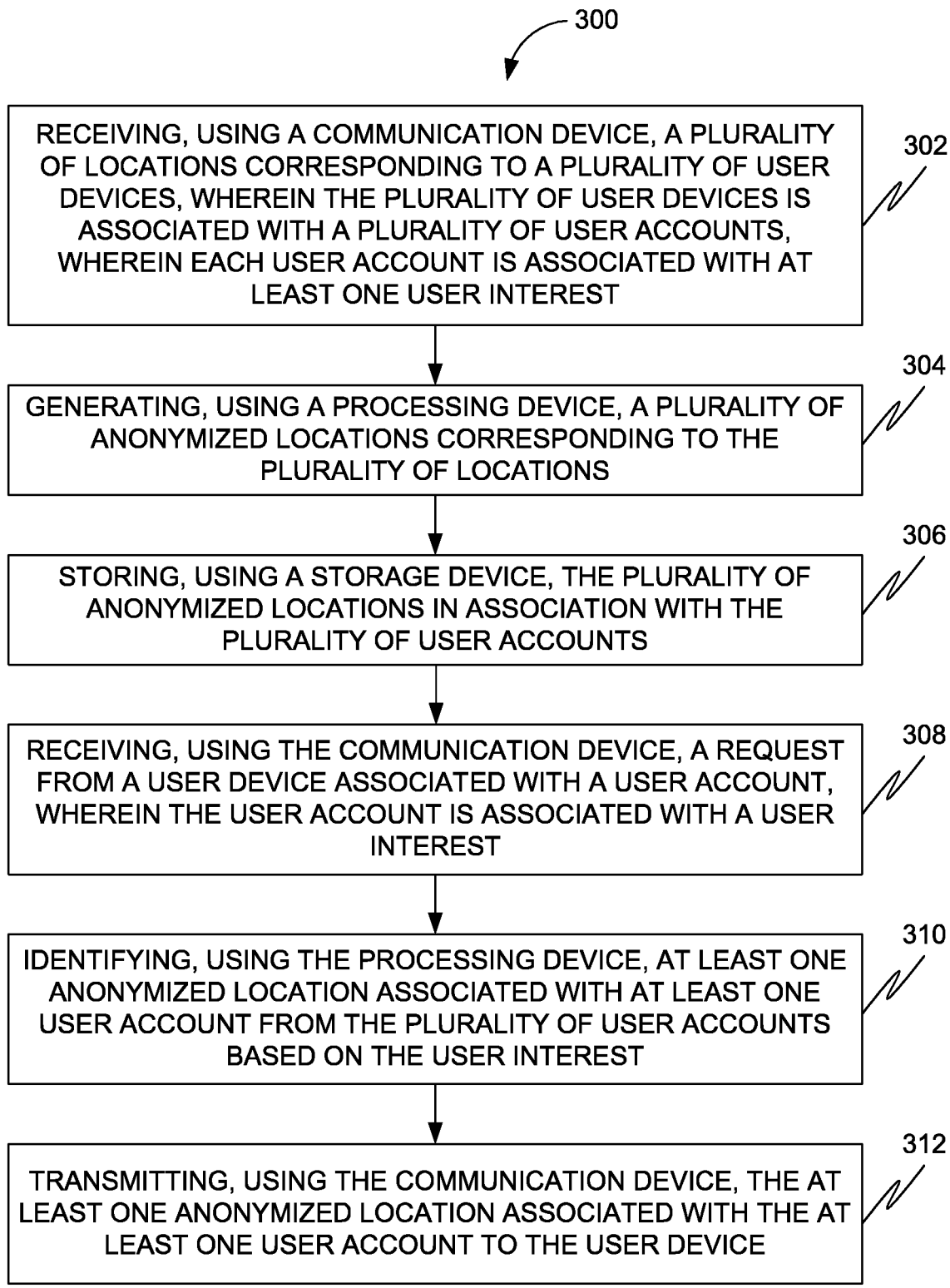
FIG. 3 illustrates a flowchart of a method of facilitating communication based on user interest, in accordance with some embodiments.

FIG. 3 illustrates a flowchart of a method 300 of facilitating communication based on user interest, in accordance with some embodiments. At 302, the method 300 includes receiving, using the communication device 202, multiple locations corresponding to multiple user devices. The multiple user devices are associated with multiple user accounts. Further, each user account may be associated with at least one user interest. A user device in the multiple user devices may be the member electronic device 106.

In some embodiments, the receiving of the plurality of locations may be further based on multiple mode indicators associated with the multiple user accounts. A mode indicator, in the multiple mode indicators, may represents one of an invisible mode and a visible mode. Accordingly, the receiving of a location of the multiple locations may be performed based on mode indicator of a corresponding user account being set to the visible mode. In other words, in this embodiment, each user may control whether their respective locations are shared with other users. For example, a user may log into the app of the invention as a "looker" only. Accordingly, the user's own location may not be transmitted to the communication device 202, so it would not be visible to other users. Thereafter, at 304, the method 300 includes generating, using the processing device 204, multiple anonymized locations corresponding to the multiple locations. According to some embodiments, the generating the multiple anonymized locations may include randomizing the locations. This is explained in further detail in conjunction with FIG. 6-7 below.

According to some embodiments, the generating the multiple anonymized locations includes identifying, using the processing device 204, multiple public places corresponding to the multiple locations and replacing, using the processing device 204, the multiple locations with corresponding locations of the multiple public places. The multiple public places may include, but is not limited to, a road, a bus station, a restaurant, and a shop. A distance between a first public place and a corresponding first location of the multiple locations may be within a predetermined distance. Therefore, instead of randomizing the locations, the processing device 204 may approximate the locations to the nearest public places. Next, at 306, the method 300 includes storing, using the storage device 206, the multiple anonymized locations in association with the multiple user accounts.

Figure 4:
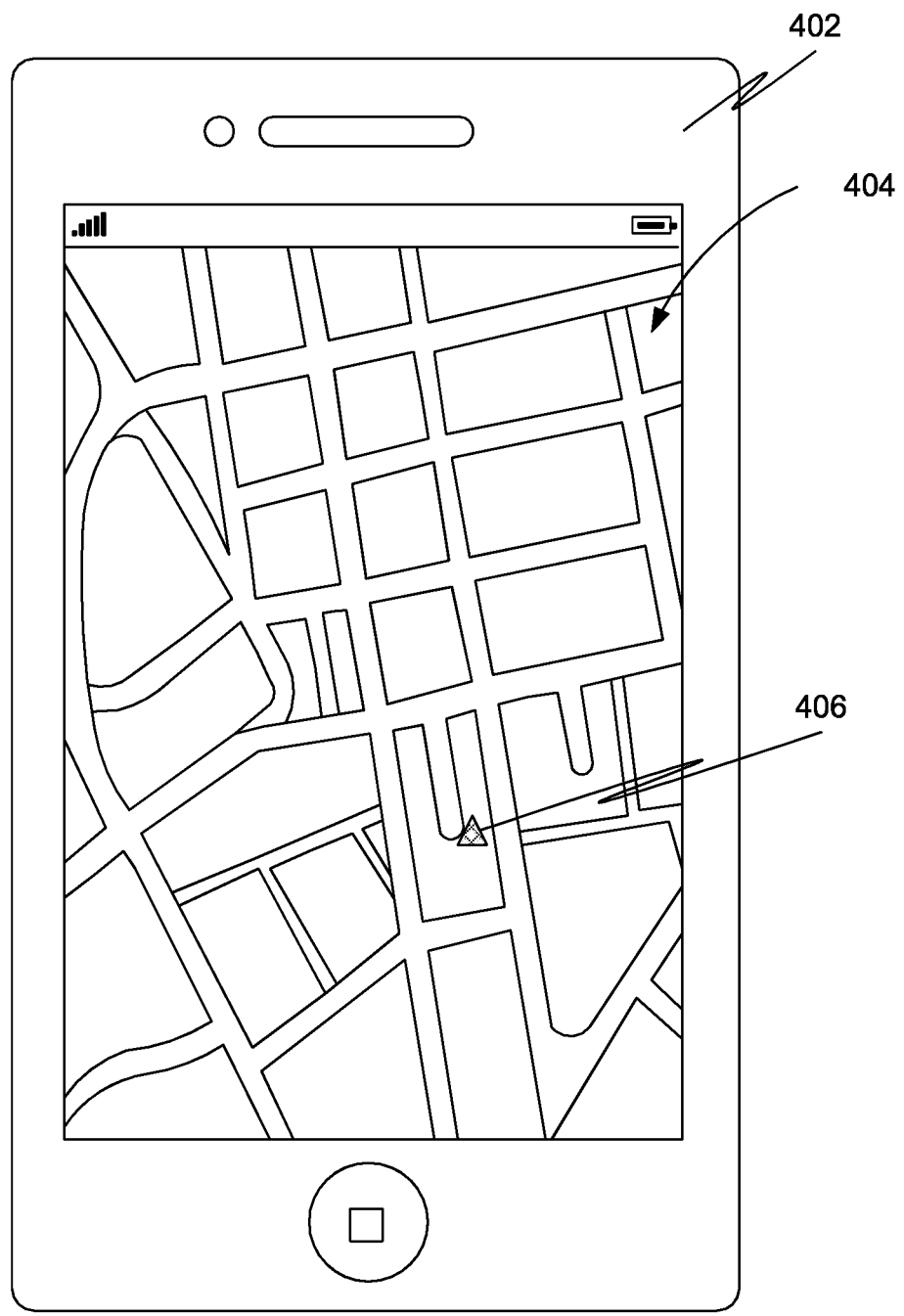
FIG. 4 illustrates a map view provided by a smartphone application, in accordance with some embodiments.
Figure 5:
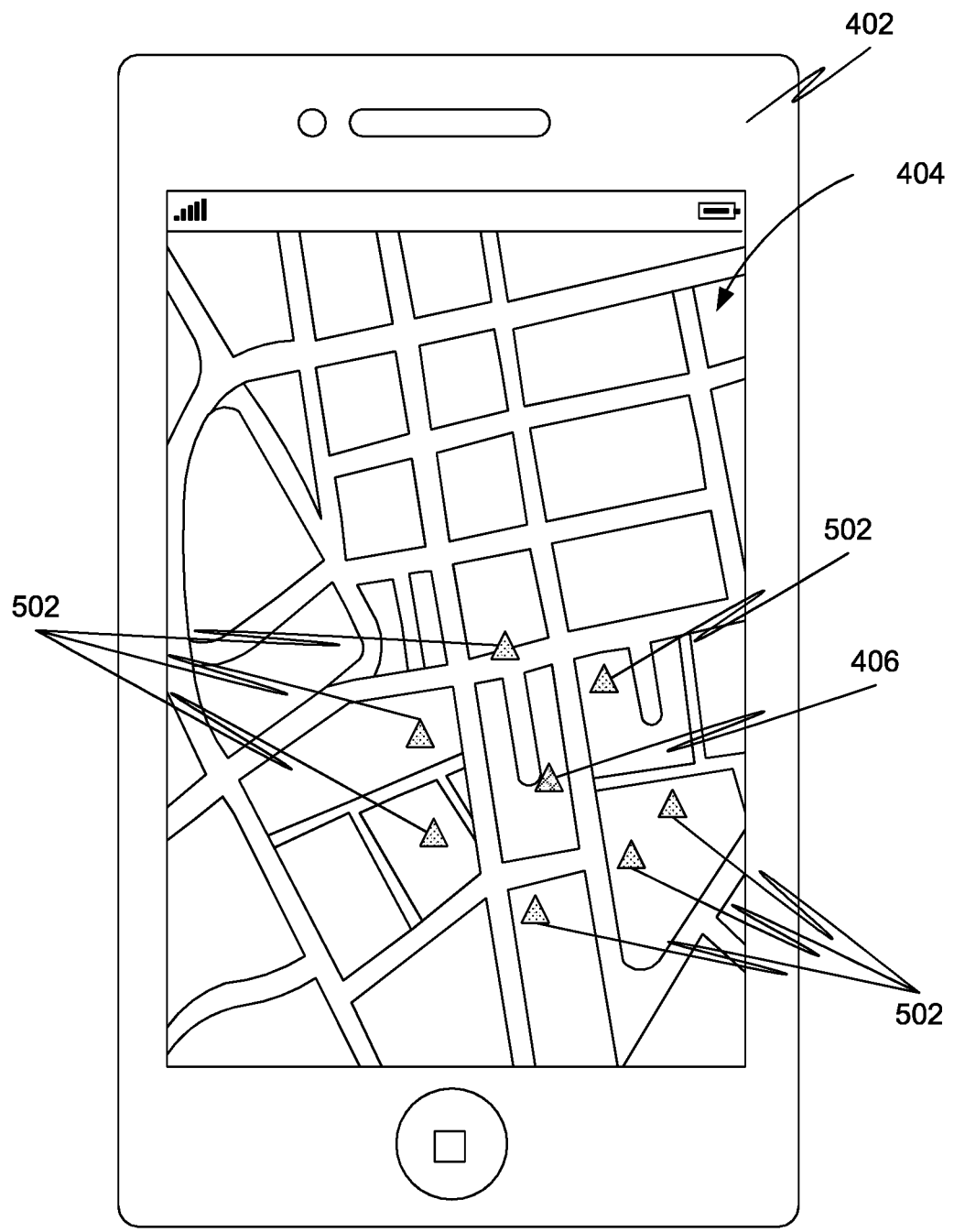
FIG. 5 illustrates a map view provided by a smartphone application, in accordance with some embodiments.

At 308, the method 300 includes receiving, using the communication device 202, a request from a user device associated with a user account, wherein the user account is associated with a user interest. For example, a user may use a smartphone application installed on their device 402 to access the system 200 as shown in FIG. 4. The smartphone application may be named "whoisnear". The smartphone application may display a map view 404 showing the current location of the user via a pin 406. The user may send a request to the communication device 202 by using an appropriate user interface element provided by the smartphone application. For example, the smartphone application may provide a menu or a button on the user interface of the smartphone application, that may be used to send the request. Then, at 310, the method 300 includes identifying, using the processing device 204, one or more anonymized locations associated with one or more user accounts from the multiple user accounts based on the user interest. Finally, at 312, the method 300 includes transmitting, using the communication device 202, the one or more anonymized locations associated with the one or more user accounts to the user device. Thereafter, the user device may be configured for displaying the one or more anonymized locations via one or more pins 502 on the map view 404 as shown in FIG. 5.

Figure 6:
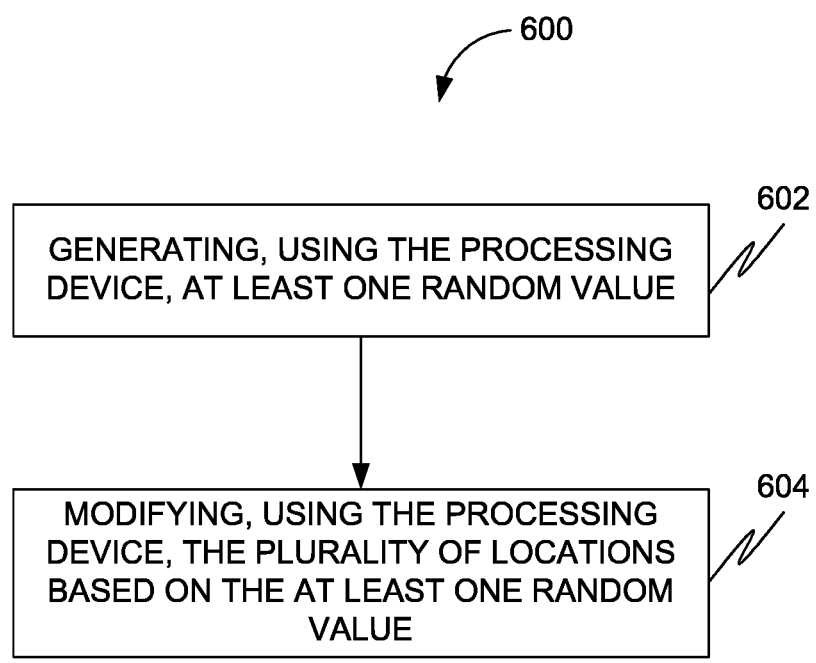
FIG. 6 illustrates a flowchart of a method for randomizing locations, in accordance with some embodiments.
Figure 7:
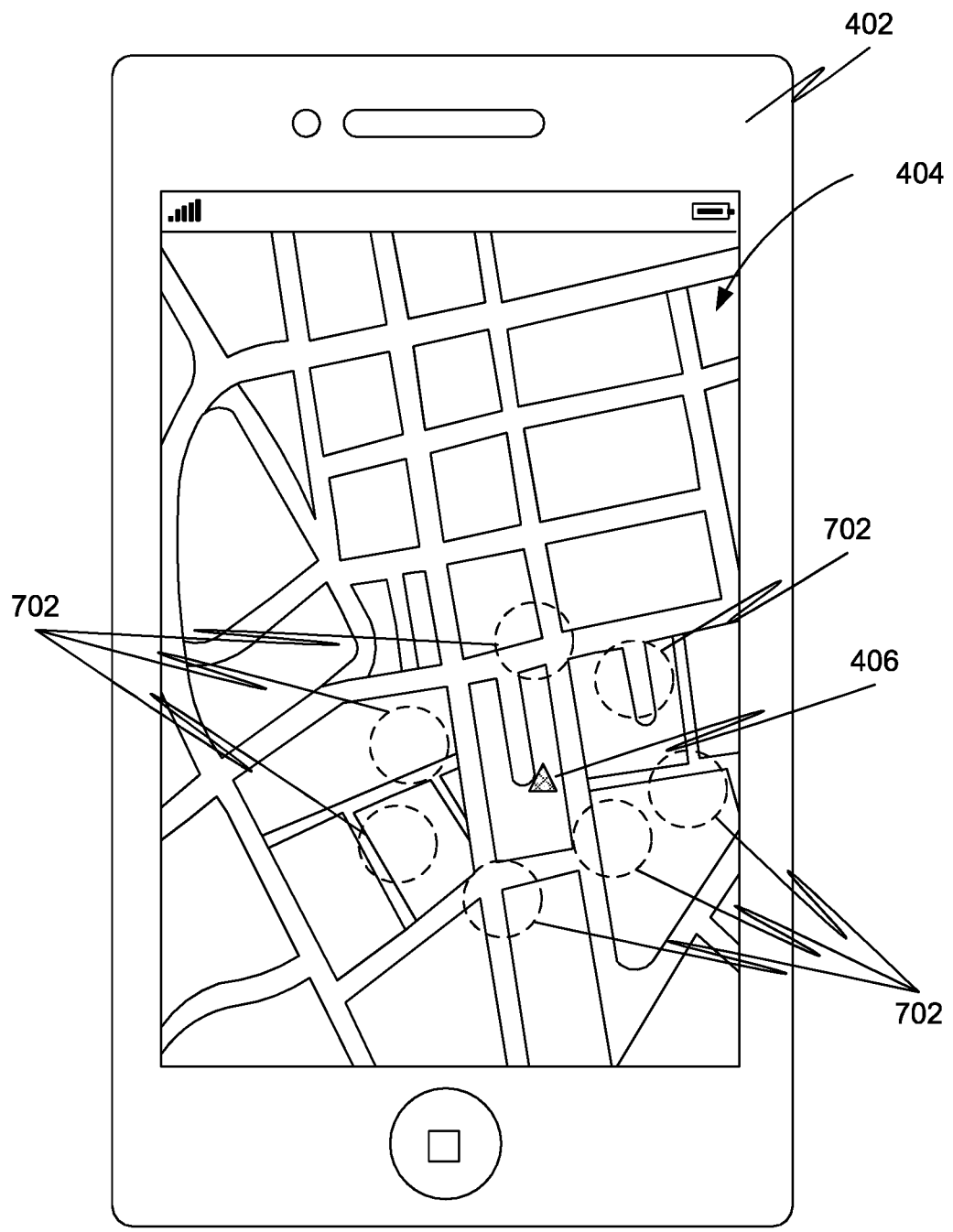
FIG. 7 illustrates a map view provided by a smartphone application, in accordance with some embodiments.

FIG. 6 illustrates a flowchart of a method 600 for randomizing locations, in accordance with some embodiments. The method 600 relates to the step 304 of the method 300. At 602, the method 600 includes generating, using the processing device 204, one or more random values. For example, the one or more random values may be generated using a PseudoRandom Number Generator (PRNG). Then, at 604, the method 600 includes modifying, using the processing device 204, the multiple locations (shown via the one or more pins 502) based on the one or more random values. For example, one or both of the latitude and the longitude values of a location may be modified in order to distort the original location, thus protecting the exact location. Accordingly, the user device may be configured for displaying the one or more randomized locations via one or more circles 702 on the map view 404 as shown in FIG. 7. The one or more circles 702 represent the uncertainty of the location of the respective user.

The randomized locations ensure that the exact location of a user is not known to other users. Further, the one or more random values may be based on one or both of an upper limit and a lower limit associated with a user account. Therefore, a user may decide how the location of the user will be distorted by specifying an upper limit and a lower limit.

Figure 8:
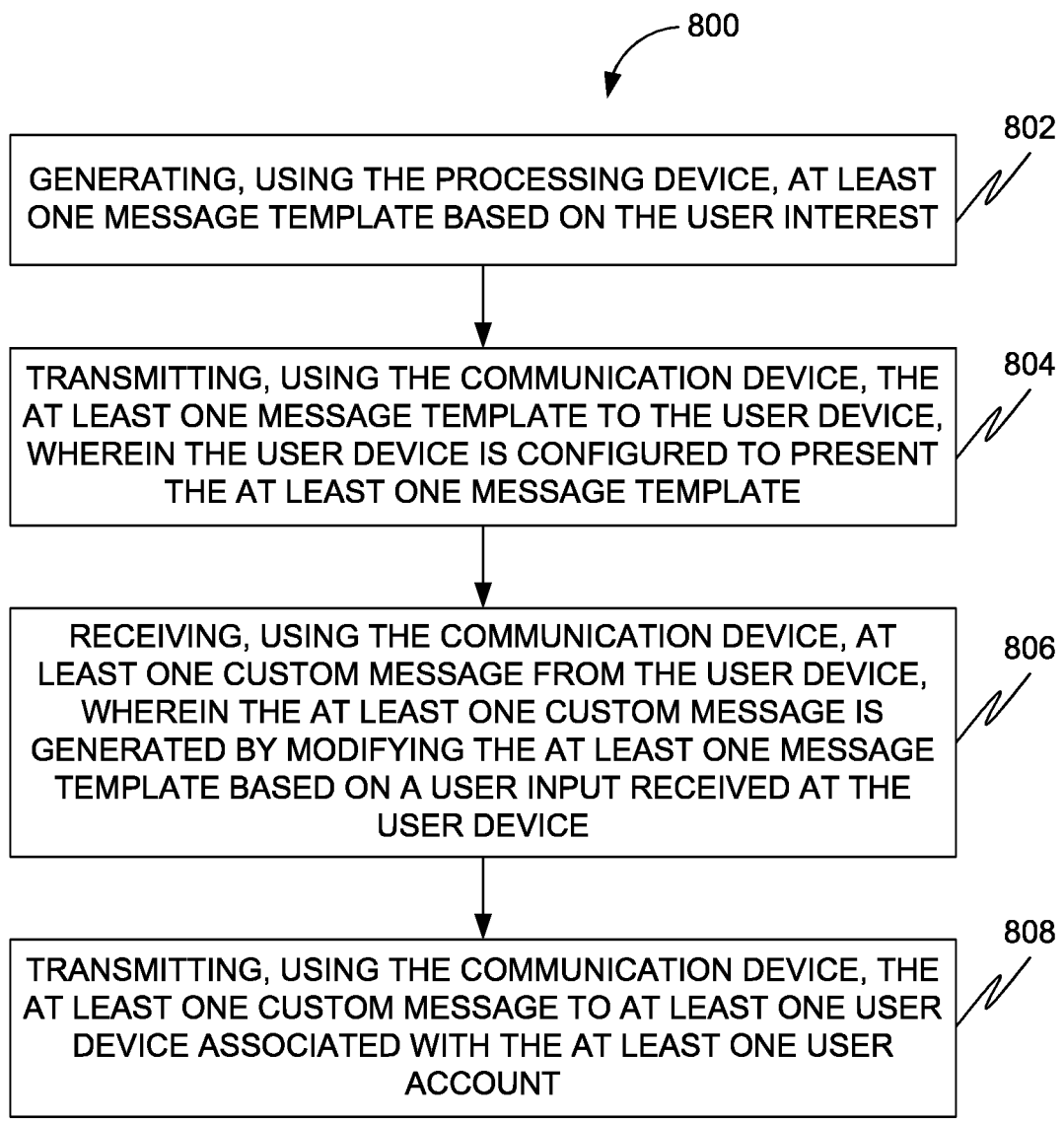
FIG. 8 illustrates a flowchart of a method for sending a message from the user device, in accordance with some embodiments.
Figure 9:
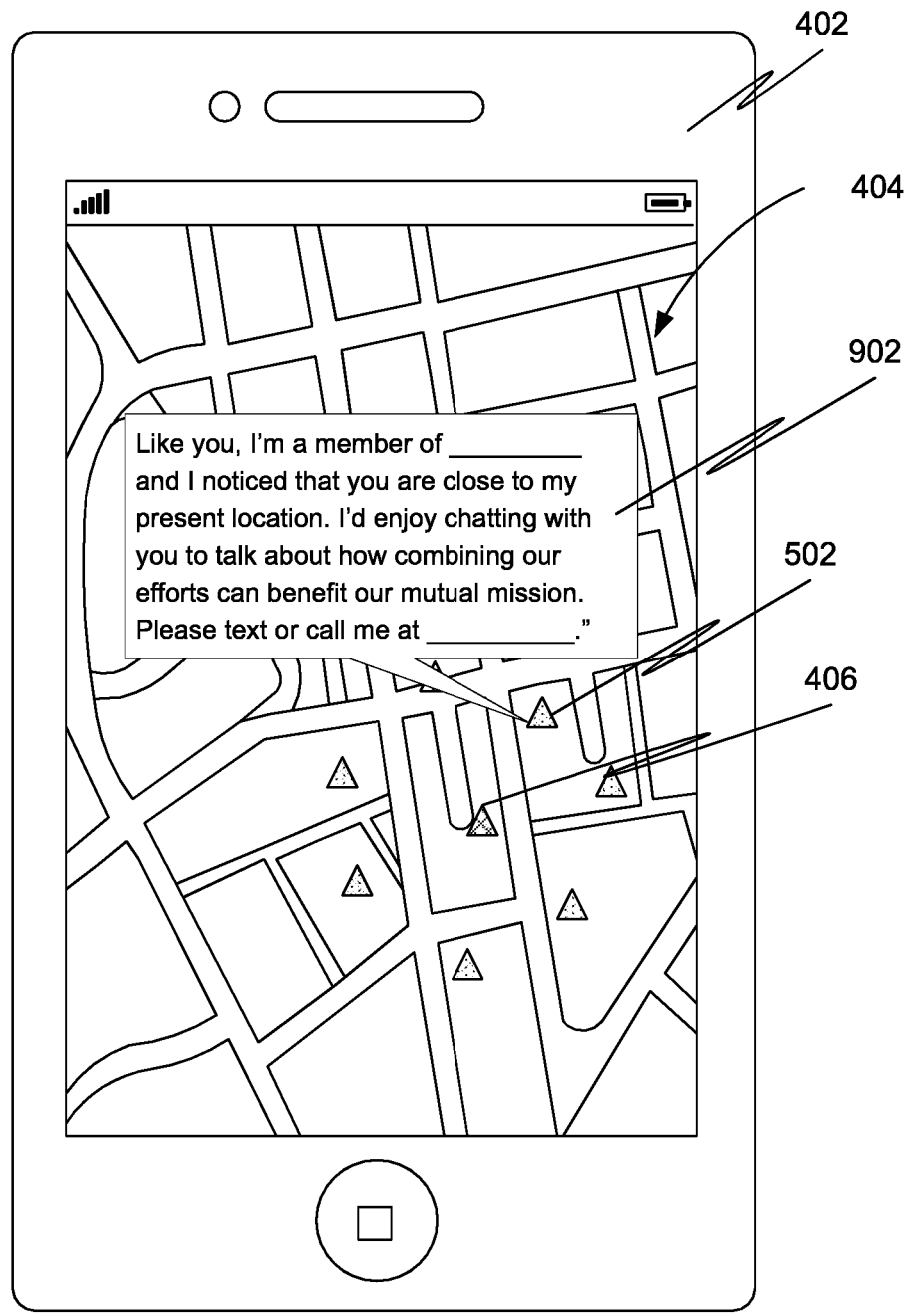
FIG. 9 illustrates a map view provided by a smartphone application, in accordance with some embodiments.

FIG. 8 illustrates a flowchart of a method 800 for sending a message from the user device, in accordance with some embodiments. At 802, the method 800 includes generating, using the processing device 204, one or more message templates based on the user interest. Then, at 804, the method 800 includes transmitting, using the communication device 202, the one or more message templates to the user device. The user device may be configured to present the one or more message templates. As shown in FIG. 9, the user at location pin 406 may indicate to send a message to the user at location pin 406. Accordingly, a message template 902 may be presented to the user at location pin 406. The message template 902 may include "Like you, I'm a member/supporter of _____, and I noticed that you are close to my present location. I'd enjoy chatting with you to talk about how combining our efforts can benefit our mutual mission. Please text or call me at _____."

Then, at 806, the method 800 includes receiving, using the communication device 202, one or more custom messages from the user device. The one or more custom messages may be generated by modifying the one or more message templates based on a user input received at the user device. Therefore, the user at location pin 406 may modify the message template 902 to prepare a custom message that includes "Like you, I'm a member/supporter of alcoholic anonymous, and I noticed that you are close to my present location. I'd enjoy chatting with you to talk about how combining our efforts can benefit our mutual mission. Please text or call me at 1XXX XXX XXX". Thereafter, at 808, the method 800 includes transmitting, using the communication device 202, the one or more custom messages to one or more user devices associated with the one or more user accounts.

In further embodiments, the one or more message templates may be generated further based on one or both of at least one user data associated with the one or more user accounts and user data associated with the user account. Therefore, in addition to the user interest, the custom message may include details about either the sender or the recipient (such as name and phone number).

The method 800 enables users to communicate with each other. All communication is routed through the system 200. Accordingly, anonymity may be maintained. In some embodiments, the messages may be directly sent from one user device (sender's user device) to another user device (recipient's user device). Accordingly, the method includes transmitting, using the communication device 202, at least one user data associated with the one or more user account to the user device. The user device may be configured for generating one or more message templates based on one or both of the at least one user data and user data associated with the user account. Further, the user device may be configured for presenting the one or more message templates to a user, receiving a user input from the user, generating one or more custom messages based on modifying of the one or more message templates based on the user input and transmitting the one or more custom messages to one or more user devices associated with the one or more user accounts.

Figure 10:
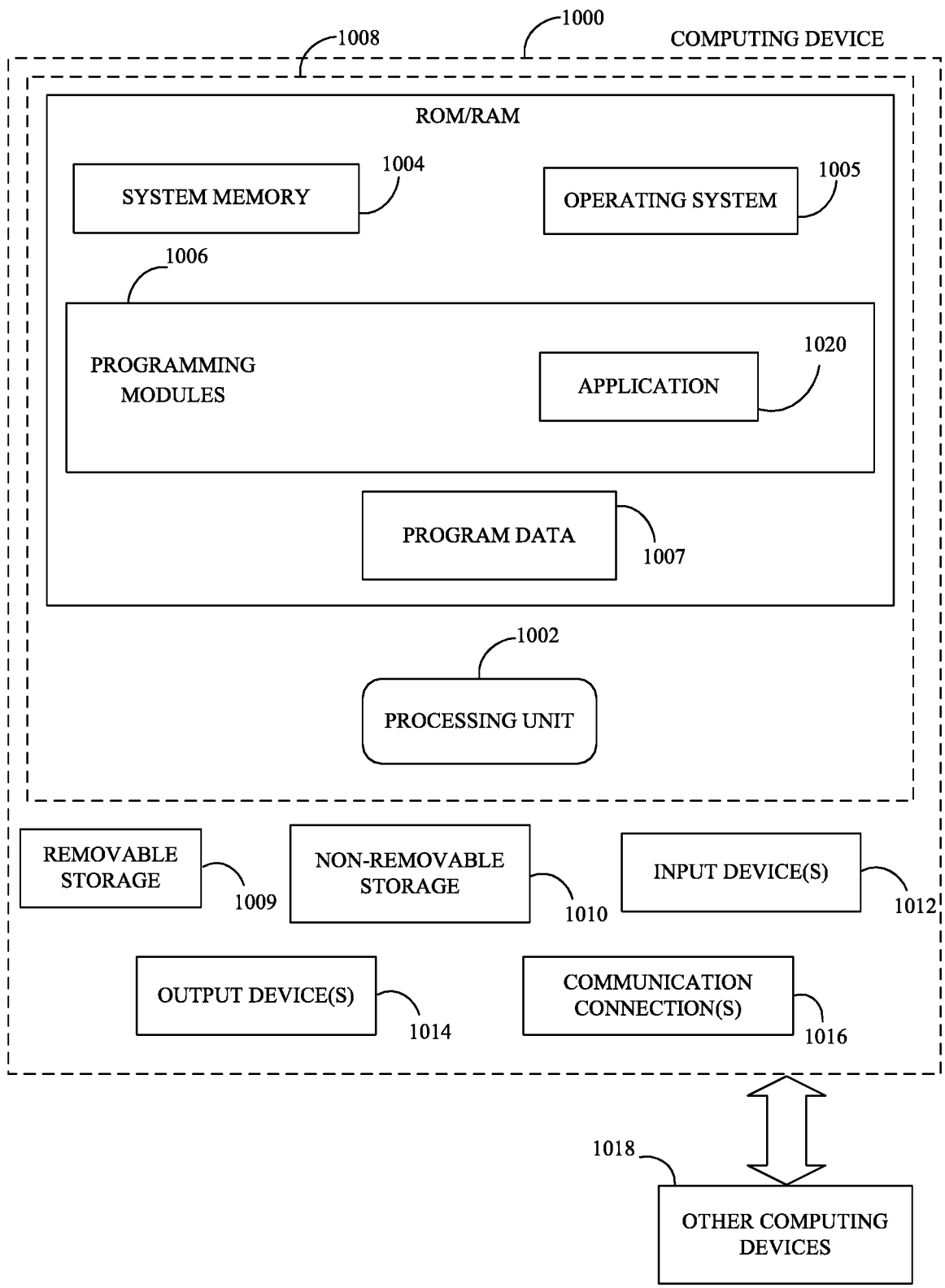
FIG. 10 illustrates an exemplary computing system that may be employed to implement processing functionality for various embodiments.

FIG. 10 is a block diagram of a system including computing device 1000. Consistent with an embodiment of the disclosure, the aforementioned memory storage and processing unit may be implemented in a computing device, such as computing device 1000 of FIG. 10. Any suitable combination of hardware, software, or firmware may be used to implement the memory storage and processing unit. For example, the memory storage and processing unit may be implemented with computing device 1000 or any of other computing devices 1018, in combination with computing device 1000. The aforementioned system, device, and processors are examples and other systems, devices, and processors may comprise the aforementioned memory storage and processing unit, consistent with embodiments of the disclosure.

With reference to FIG. 10, a system consistent with an embodiment of the disclosure may include a computing device or cloud service, such as computing device 1000. In a basic configuration, computing device 1000 may include at least one processing unit 1002 and a system memory 1004. Depending on the configuration and type of computing device, system memory 1004 may comprise, but is not limited to, volatile (e.g. random access memory (RAM)), non-volatile (e.g. read-only memory (ROM)), flash memory, or any combination. System memory 1004 may include operating system 1005, one or more programming modules 1006, and may include a program data 1007. Operating system 1005, for example, may be suitable for controlling computing device 1000's operation. In one embodiment, programming modules 1006 may include image encoding module, machine learning module and image classifying module. Furthermore, embodiments of the disclosure may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010. Computer storage media may include volatile and nonvolatile, removable and non-removable media implemented in any method or technology for storage of information, such as computer-readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, etc. Output device(s) 1014 such as a display, speakers, a printer, etc. may also be included. The aforementioned devices are examples and others may be used.

Computing device 1000 may also contain a communication connection 1016 that may allow device 1000 to communicate with other computing devices 1018, such as over a network in a distributed computing environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1004, including operating system 1005. While executing on processing unit 1002, programming modules 1006 (e.g., application 1020) may perform processes including, for example, one or more stages of methods 300, 600 and 800 as described above. The aforementioned process is an example, and processing unit 1002 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

DETAIL DESCRIPTIONS OF THE EMBODIMENTS

A method of facilitating communication based on user interest is provided. The method may include receiving, using a communication device, a plurality of locations corresponding to a plurality of user devices. Further, the plurality of user devices may be associated with a plurality of user accounts. Further, each user account may be associated with at least one user interest. Further, the method may include generating, using a processing device, a plurality of anonymized locations corresponding to the plurality of locations. Further, the method may include storing, using a storage device, the plurality of anonymized locations in association with the plurality of user accounts. Further, the method may include receiving, using the communication device, a request from a user device associated with a user account. Further, the user account may be associated with a user interest. Further, the method may include identifying, using the processing device, at least one anonymized location associated with at least one user account from the plurality of user accounts based on the user interest. Further, the method may include transmitting, using the communication device, the at least one anonymized location associated with the at least one user account to the user device.

In some embodiments, the receiving of the plurality of locations may be further based on a plurality of mode indicators associated with the plurality of accounts. Further, a mode indicator represents one of an invisible mode and a visible mode. Further, the receiving of a location of the plurality of locations may be performed based on mode indicator of a corresponding user account being set to the visible mode. In some embodiments, generating the plurality of anonymized locations comprises generating, using the processing device, at least one random value, and modifying, using the processing device, the plurality of locations based on the at least one random value. In some embodiments, the at least one random value may be based on one or more of an upper limit and a lower limit. In some embodiments, one or more of the lower limit and the upper limit may be associated with each of the plurality of user accounts. In some embodiments, generating the plurality of anonymized locations comprises identifying, using the processing device, a plurality of public places corresponding to the plurality of locations. Further, a distance between a first public place and a corresponding first location of the plurality of locations may be within a predetermined distance, and replacing, using the processing device, the plurality of locations with corresponding locations of the plurality of public places.

In some embodiments, the method may further include generating, using the processing device, at least one message template based on the user interest. The method may further include transmitting, using the communication device, the at least one message template to the user device. Further, the user device may be configured to present the at least one message template. The method may further include receiving, using the communication device, at least one custom message from the user device. Further, the at least one custom message may be generated by modifying the at least one message template based on a user input received at the user device. The method may further include transmitting, using the communication device, the at least one custom message to at least one user device associated with the at least one user account.

In some embodiments, the at least one message template may be generated further based on one or more of at least one user data associated with the at least one user account and user data associated with the user account. In some embodiments, the method may further include transmitting, using the communication device, at least one user data associated with the at least one user account to the user device. Further, the user device may be configured for generating at least one message template based on one or more of the at least one user data and user data associated with the user account. Further, the user device may be configured for presenting the at least one message template to a user; receiving a user input from the user. Further, the user device may be configured for generating at least one custom message based on modifying of the at least one message template based on the user input. Further, the user device may be configured for transmitting the at least one custom message to at least one user device associated with the at least one user account. In some embodiments, the user device may be configured for displaying at least one anonymized location on a map.

A system for facilitating communication based on user interest is provided. The system may include a communication device configured for receiving a plurality of locations corresponding to a plurality of user devices. Further, the plurality of user devices may be associated with a plurality of user accounts. Further, each user account may be associated with at least one user interest. Further, the communication device may be configured for receiving a request from a user device associated with a user account. Further, the user account may be associated with a user interest. Further, the communication device may be configured for transmitting at least one anonymized location associated with the at least one user account to the user device. Further, the system may include a processing device configured for generating a plurality of anonymized locations corresponding to the plurality of locations. Further, the processing device may be configured for identifying the at least one anonymized location associated with at least one user account from the plurality of user accounts based on the user interest. Further, the system may include a storage device configured for storing the plurality of anonymized locations in association with the plurality of user accounts.

In some embodiments, the receiving of the plurality of locations may be further based on a plurality of mode indicators associated with the plurality of accounts. Further, a mode indicator represents one of an invisible mode and a visible mode. Further, the receiving of a location of the plurality of locations may be performed based on mode indicator of a corresponding user account being set to the visible mode. In some embodiments, for generating the plurality of anonymized locations, the processing device may be configured for: generating at least one random value; and modifying the plurality of locations based on the at least one random value. In some embodiments, the at least one random value may be based on one or more of an upper limit and a lower limit. In some embodiments, one or more of the lower limit and the upper limit may be associated with each of the plurality of user accounts. In some embodiments, for generating the plurality of anonymized locations, the processing device may be configured for: identifying a plurality of public places corresponding to the plurality of locations. Further, a distance between a first public place and a corresponding first location of the plurality of locations may be within a predetermined distance; and replacing the plurality of locations with corresponding locations of the plurality of public places.

In some embodiments, the processing device may be further configured for generating at least one message template based on the user interest. Further, the communication device may be further configured for: transmitting the at least one message template to the user device. Further, the user device may be configured to present the at least one message template; receiving at least one custom message from the user device. Further, the at least one custom message may be generated by modifying the at least one message template based on a user input received at the user device; and transmitting the at least one custom message to at least one user device associated with the at least one user account.

In some embodiments, the at least one message template may be generated further based on one or more of at least one user data associated with the at least one user account and user data associated with the user account.

In some embodiments, the communication device may be further configured for transmitting at least one user data associated with the at least one user account to the user device. Further, the user device may be configured for generating at least one message template based on one or more of the at least one user data and user data associated with the user account. Further, the user device may be configured for presenting the at least one message template to a user. Further, the user device may be configured for receiving a user input from the user; generating at least one custom message based on modifying of the at least one message template based on the user input. Further, the user device may be configured for transmitting the at least one custom message to at least one user device associated with the at least one user account. In some embodiments, the user device may be configured for displaying at least one anonymized location on a map.

In some embodiments, an online platform may provide one or more mobile applications corresponding to one or more user interests. For instance, multiple applications may be provided corresponding to multiple self-help groups (e.g. alcoholics anonymous, depression etc.). Accordingly, users may select and download one or more applications to their user devices based on their interests. Further, the online platform may monitor such downloading of applications by the user devices. Accordingly, the online platform may capture user data (name, contact details, interest, location etc.) and associate the user data with downloaded applications. Additionally, in some embodiments, the online platform may communicate the user data so captured to third parties, such as, for example, self-help organizations. As a result, such self-help organizations may be able to reach out (e.g. targeted marketing and support) to users in order to facilitate activities relevant to the user's interests. Further, the online platform may enable a third party to view concentration of application users in a selected region (e.g. neighborhoods, city, county, state and country).

Furthermore, in some embodiments, one or more third parties, such as self-help organizations may be displayed on the map in addition to other users with similar interests. Accordingly, a user viewing the map may be able to contact either other users with similar interests or one or more third parties, such as regional offices of self-help organization. In addition, in some embodiments, the user may also be able to view the location of each meeting, area and regional office location.

Although the invention has been explained in relation to its preferred embodiment, it is to be understood that many other possible modifications and variations can be made without departing from the spirit and scope of the invention.

I claim:

1. A method of facilitating communication based on user interests and location, the method comprising:

receiving, using a communication device, a plurality of locations corresponding to a plurality of user devices, wherein the plurality of user devices is associated with a plurality of user accounts, wherein each user account is associated with at least one user interest;

generating, using a processing device, a plurality of anonymized locations corresponding to the plurality of locations;

storing, using a storage device, the plurality of anonymized locations in association with the plurality of user accounts;

receiving, using the communication device, a request from a user device, wherein the user device is associated with a user account, wherein the user account is associated with a user interest;

identifying, using the processing device, at least one anonymized location associated with at least one user account from the plurality of user accounts based on the user interest;

transmitting, using the communication device, the at least one anonymized location associated with the at least one user account to the user device;

generating, using the processing device, at least one message template based on the user interest;

transmitting, using the communication device, the at least one message template to the user device, wherein the user device is configured to present the at least one message template;

receiving, using the communication device, at least one custom message from the user device, wherein the at least one custom message is generated by modifying the at least one message template based on a user input received at the user device; and transmitting, using the communication device, the at least one custom message to at least one user device associated with the at least one user account.

2. The method of claim 1, wherein the receiving of the plurality of locations is further based on a plurality of mode indicators associated with the plurality of accounts, wherein a mode indicator represents one of an invisible mode and a visible mode, wherein the receiving of a location of the plurality of locations is performed based on mode indicator of a corresponding user account being set to the visible mode.

3. The method of claim 1, wherein generating the plurality of anonymized locations comprises:
generating, using the processing device, at least one random value; and
modifying, using the processing device, the plurality of locations based on the at least one random value.

4. The method of claim 3, wherein the at least one random value is based on at least one of an upper limit and a lower limit.

5. The method of claim 4, wherein at least one of the lower limit and the upper limit is associated with each of the plurality of user accounts.

6. The method of claim 1, wherein generating the plurality of anonymized locations comprises:
identifying, using the processing device, a plurality of public places corresponding to the plurality of locations, wherein a distance between a first public place and a corresponding first location of the plurality of locations is within a predetermined distance; and
replacing, using the processing device, the plurality of locations with corresponding locations of the plurality of public places.

7. The method of claim 1, wherein the at least one message template is generated further based on at least one of at least one user data associated with the at least one user account and user data associated with the user account.

8. The method of claim 1 further comprising transmitting, using the communication device, at least one user data associated with the at least one user account to the user device, wherein the user device is configured for:
generating at least one message template based on at least one of the at least one user data and user data associated with the user account;
presenting the at least one message template to a user;
receiving a user input from the user;
generating at least one custom message based on modifying of the at least one message template based on the user input; and
transmitting the at least one custom message to at least one user device associated with the at least one user account.

9. The method of claim 1, wherein the user device is configured for displaying at least one anonymized location on a map.

10. A system for facilitating communication based on user interests and location, the system comprising:
a communication device configured for:
receiving a plurality of locations corresponding to a plurality of user devices, wherein the plurality of user devices is associated with a plurality of user accounts, wherein each user account is associated with at least one user interest;
receiving a request from a user device, wherein the user device is associated with a user account, wherein the user account is associated with a user interest; and
transmitting at least one anonymized location associated with the at least one user account to the user device;
a processing device configured for:
generating a plurality of anonymized locations corresponding to the plurality of locations; and
identifying the at least one anonymized location associated with at least one user account from the plurality of user accounts based on the user interest;
a storage device configured for storing the plurality of anonymized locations in association with the plurality of user accounts;
wherein the processing device is further configured for generating at least one message template based on the user interest;
wherein the communication device is further configured for:
transmitting the at least one message template to the user device, wherein the user device is configured to present the at least one message template;
receiving at least one custom message from the user device, wherein the at least one custom message is generated by modifying the at least one message template based on a user input received at the user device; and
transmitting the at least one custom message to at least one user device associated with the at least one user account.

11. The system of claim 10, wherein the receiving of the plurality of locations is further based on a plurality of mode indicators associated with the plurality of accounts, wherein a mode indicator represents one of an invisible mode and a visible mode, wherein the receiving of a location of the plurality of locations is performed based on mode indicator of a corresponding user account being set to the visible mode.

12. The system of claim 10, wherein for generating the plurality of anonymized locations, the processing device is configured for:
generating at least one random value; and
modifying the plurality of locations based on the at least one random value.

13. The system of claim 12, wherein the at least one random value is based on at least one of an upper limit and a lower limit.

14. The system of claim 13, wherein at least one of the lower limit and the upper limit is associated with each of the plurality of user accounts.

15. The system of claim 10, wherein for generating the plurality of anonymized locations, the processing device is configured for:
identifying a plurality of public places corresponding to the plurality of locations, wherein a distance between a first public place and a corresponding first location of the plurality of locations is within a predetermined distance; and
replacing the plurality of locations with corresponding locations of the plurality of public places.

16. The system of claim 10, wherein the at least one message template is generated further based on at least one of at least one user data associated with the at least one user account and user data associated with the user account.

17. The system of claim 10, wherein the communication device is further configured for transmitting at least one user data associated with the at least one user account to the user device, wherein the user device is configured for:
generating at least one message template based on at least one of the at least one user data and user data associated with the user account;
presenting the at least one message template to a user;
receiving a user input from the user;

generating at least one custom message based on modifying of the at least one message template based on the user input; and transmitting the at least one custom message to at least one user device associated with the at least one user account.

18. The system of claim 10, wherein the user device is configured for displaying at least one anonymized location on a map.

\* \* \* \* \*